United States Patent
Sánchez et al.

(10) Patent No.: US 10,711,932 B2
(45) Date of Patent: Jul. 14, 2020

(54) PLUG-IN-CONNECTION BETWEEN A CONNECTING PART AND A PLUG-IN-PART

(71) Applicant: MANN+HUMMEL GmbH, Ludwigsburg (DE)

(72) Inventors: Jorge Sánchez, Saragossa (ES); Leopoldo Marzal Lopez, Saragossa (ES); Juan Jose Olivan, Saragossa (ES); Jaime Gracia Heras, Saragossa (ES)

(73) Assignee: MANN+HUMMEL GmbH, Ludwigsburg (DE)

( * ) Notice: Subject to any disclaimer, the term of this patent is extended or adjusted under 35 U.S.C. 154(b) by 228 days.

(21) Appl. No.: 15/892,069

(22) Filed: Feb. 8, 2018

(65) Prior Publication Data

US 2018/0224040 A1 Aug. 9, 2018

(30) Foreign Application Priority Data

Feb. 9, 2017 (EP) ..................................... 17380005

(51) Int. Cl.
*F16L 17/035* (2006.01)
*F16L 37/088* (2006.01)
*F02M 35/10* (2006.01)
*F16J 15/08* (2006.01)
*F16J 15/02* (2006.01)

(52) U.S. Cl.
CPC ..... *F16L 37/088* (2013.01); *F02M 35/10144* (2013.01); *F02M 35/10157* (2013.01); *F16J 15/022* (2013.01); *F16J 15/0887* (2013.01); *F16L 17/035* (2013.01); *Y02T 10/144* (2013.01)

(58) Field of Classification Search
CPC ......... F16L 23/04; F16L 21/002; F16L 21/03; F16L 17/035
USPC .......................... 285/374, 903, 368, 366, 365
See application file for complete search history.

(56) References Cited

U.S. PATENT DOCUMENTS 3,207,524 A * 9/1965 Trbovich ............. F16J 15/0887
277/647
3,797,836 A * 3/1974 Halling ................ F16J 15/0887
285/367
3,857,572 A * 12/1974 Taylor .................... F16L 23/02
277/609

(Continued)

FOREIGN PATENT DOCUMENTS

WO 2005103550 A1 11/2005

*Primary Examiner* — David Bochna
(74) *Attorney, Agent, or Firm* — James Hasselbeck

(57) ABSTRACT

A plug-in connection between a connecting part and a plug-in part, which are configured to be plugged into one another in an axial direction of the plug-in connection, is provided with a sealing groove disposed between connecting part and plug-in part. A sealing ring is disposed between the connecting part and the plug-in part in the sealing groove. The sealing ring is supported in the sealing groove by the connecting part and by the plug-in part, respectively, in a radial direction of the plug-in connection and exerts a sealing pressure in the radial direction. The sealing ring has an omega-shaped cross section with a rounded body portion having an open side and with supporting legs connected to opposed ends of the rounded body portion at the open side of the rounded body portion. The open side of the rounded body portion faces outwardly in the radial direction.

13 Claims, 2 Drawing Sheets

(56) References Cited

U.S. PATENT DOCUMENTS

| | | | | |
|---|---|---|---|---|
| 4,121,843 A * | 10/1978 | Halling | ............... | F01D 11/005 277/647 |
| 4,336,943 A * | 6/1982 | Chaplin | ............... | F16L 23/20 277/643 |
| 4,361,335 A * | 11/1982 | Vinciguerra | ........... | B21D 53/18 277/633 |
| 4,640,530 A * | 2/1987 | Abbes | ................... | F16L 23/04 285/18 |
| 5,249,814 A * | 10/1993 | Halling | ............... | F16J 15/0887 228/214 |
| 5,354,072 A | 10/1994 | Nicholson | | |
| 5,669,612 A | 9/1997 | Nicholson | | |
| 5,716,052 A | 2/1998 | Swensen et al. | | |
| 5,799,954 A | 9/1998 | Layer | | |
| 6,322,087 B1 * | 11/2001 | Swensen | ............... | F16L 23/04 277/626 |
| 6,439,619 B1 * | 8/2002 | Storage | ................ | F16L 23/04 285/330 |
| 6,612,584 B1 * | 9/2003 | Ferouz | ................. | F16L 23/20 277/609 |
| 6,659,472 B2 * | 12/2003 | Aksit | .................. | F01D 11/003 277/647 |
| 8,162,327 B2 * | 4/2012 | Halling | ................ | F16L 23/24 277/647 |
| 8,475,139 B2 * | 7/2013 | Sprague | ................ | F04F 5/44 277/603 |
| 8,814,175 B2 * | 8/2014 | Tohdoh | .............. | F16J 15/0887 277/647 |
| 2007/0138751 A1 | 6/2007 | Iguchi et al. | | |

* cited by examiner

PLUG-IN-CONNECTION BETWEEN A CONNECTING PART AND A PLUG-IN-PART

TECHNICAL FIELD

The invention relates to a plug-in connection between a connecting part and a plug-in part which can be axially plugged into one another. For example, the plug-in connection can be used in an intake duct of an internal combustion engine.

BACKGROUND OF THE INVENTION

WO 2005/103550 A1 discloses a plug-in connection for producing liquid-tight or gas-tight connections in the automobile industry, the plug-in connection comprising a connecting piece and a plug-in part and a moulded sealing ring which is received in a sealing groove between the connecting piece and the plug-in part. The sealing ring has a U-shaped cross section with the open side of the U-shape aligned with the longitudinal axis of the connecting piece and the plug-in part. The sealing ring is radially supported by the connecting piece and the plug-in part, respectively, and exerts a sealing pressure between both parts.

When assembling the plug-in connection the sealing ring is exposed to deformation due to interference between the plug-in part and the outer face of the sealing ring.

EP 0 692 660 A1 discloses a groove seal of metal which has a cross section in the form of a capital letter omega comprising a curved C-shaped body portion and supporting legs at each end of the body portion. The open side of the C-shaped body portion is aligned with the longitudinal axis of the pieces being connected together. In the radial direction, the supporting legs of the groove seal contact the outer radial and inner radial wall of the sealing groove.

SUMMARY OF THE INVENTION

It is an object of the invention to provide a plug-in connection comprising a sealing ring which is gas-tight or liquid-tight and has a simple design.

According to the invention, a plug-in connection between a connecting part and a plug-in part is provided which can be axially plugged into one another. In an advantageous embodiment the plug-in connection is part of an intake duct of an internal combustion engine supplying air to the cylinders of the internal combustion engine.

The plug-in connection comprises a sealing ring which can be configured as a moulded ring of elastic material and is received in a sealing groove between the connecting part and the plug-in part. The sealing ring is radially supported by the connecting part and the plug-in part in opposite radial directions. "Radial" is defined as the perpendicular direction to the longitudinal axis of both the connecting part and the plug-in part. In the plug-in connection, the sealing ring exerts a sealing pressure in the radial direction resulting in the gas-tight or liquid-tight connection of the connecting part and the plug-in part.

The sealing ring has an omega-shaped cross section which comprises a rounded body portion and supporting legs fixed to each end of the body portion at its open side. The rounded body portion can be, for example, C-shaped or shaped like a divided circle. There is a supporting leg at each end of the rounded body portion which is directed sideward. According to the invention, the open side of the rounded body portion and the supporting legs are positioned next to the radial outside part of the plug-in connection, i.e., are facing outwardly in radial direction. In this configuration, the outside of the rounded body portion contacts the plug-in part at the radial inner side of the sealing groove and the supporting legs contact the connecting part at the radial outer side. In the axial direction—parallel to the longitudinal axis of both the connecting part and the plug-in part—the supporting legs of the sealing ring are positioned in series and both exert a radial sealing pressure. Once the sealing ring is in the correct position, there are contact forces which close the remaining gaps. The contact force vector acts both in the axial and the radial directions.

When assembling the plug-in connection, first the sealing ring is inserted into the sealing groove which can be positioned in the connection part. In a following step, the plug-in part, which has an outside diameter that is smaller than or equal to the inside diameter of the connecting part, is plugged into the connecting part. When inserting the plug-in part into the connecting part, the outside of the plug-in part is in contact with the rounded body portion of the omega shaped sealing ring. Due to the rounded configuration there is only a small friction force acting between the sealing ring and the plug-in part upon insertion into the connecting part. The friction does not lead to a significant deformation of the sealing ring; however, due to the elastic properties any deformation of the sealing ring is reversible so that the sealing ring returns to its initial shape when the plug-in part has reached its final axial position in the connecting part. As a result, after finishing the assembly the sealing ring is not significantly stressed by axial deformation and is therefore able to transmit a radial sealing pressure evenly over its entire axial length.

According to a preferred embodiment, the plug-in connection comprises a retention ring which is axially positioned next to an open front face of the sealing groove. The retention ring supports the sealing ring axially so that the sealing ring remains in its axial position in the sealing groove. In case of a symmetrical design, the sealing ring also would keep its symmetrical configuration even when stressed with radial pressure, in the ideal case of no friction between the parts According to another preferred embodiment, the rounded body portion and the supporting legs are monolithic.

According to another preferred embodiment, the rounded body portion and the supporting legs have the same width. In an alternative embodiment, it is also possible that the supporting legs have a lesser width than the rounded body portion of the sealing ring. It is also possible that the transition part between the rounded body portion and each supporting leg has a smaller diameter than the rounded body portion as well as than the supporting leg so that the supporting legs are able to accomplish a pivotal movement relative to the rounded body portion.

According to another preferred embodiment, a protrusion is arranged in the sealing groove for axially supporting the sealing ring. The protrusion secures the sealing ring in its position in the sealing groove when assembling the plug-in connection. Axial forces acting on the sealing ring while the plug-in part is inserted into the connecting part are supported by the protrusion which is positioned at the inner side of the sealing groove. The protrusion may comprise a flattened or rounded surface which protrudes into the rounded body portion of the sealing ring. It is also possible that the radial protrusion has a pointed or acute tip. The protrusion might be helpful in case of a non-lubricated sealing ring which leads to an excessive friction coefficient or in case of a gross mismatch due to large tolerances.

The protrusion either extends in the radial direction or in the axial direction. The protrusion can be part of the connecting part or of the plug-in part. In a preferred embodiment, the protrusion is part of the connecting part and extends in the axial direction adjacent to the radial inner side of the sealing groove. The protrusion can be configured as a rounded nose or as a tip with an inclined surface.

According to another preferred embodiment, the front end of the supporting legs extend in the lateral direction approximately as far as the rounded body portion. The transition between the rounded body portion and the supporting leg is formed as a recess. The supporting legs extend in an angular position in the lateral direction of the sealing ring. The angle between each supporting leg and the lateral axis of the sealing ring is in a range of, for example, between 30° and 90°.

When mounted in an intake duct of an internal combustion engine, both the connecting part and the plug-in part belong to the intake port of the intake duct. In a turbocharged internal combustion engine, the plug-in connection may be positioned upstream of the compressor of the turbocharger. In this configuration, low pressure prevails inside the plug-in connection. According to an alternative embodiment the plug-in connection is positioned downstream of the compressor; hence, high pressure prevails inside the plug-in connection.

BRIEF DESCRIPTION OF THE DRAWINGS

A description will now be given as a non-limiting example of an embodiment of a plug-in connection according to the present invention. Reference will be had to the attached drawings.

In the Figures, same components are provided with the same reference characters.

DETAILED DESCRIPTION

Figure 1:
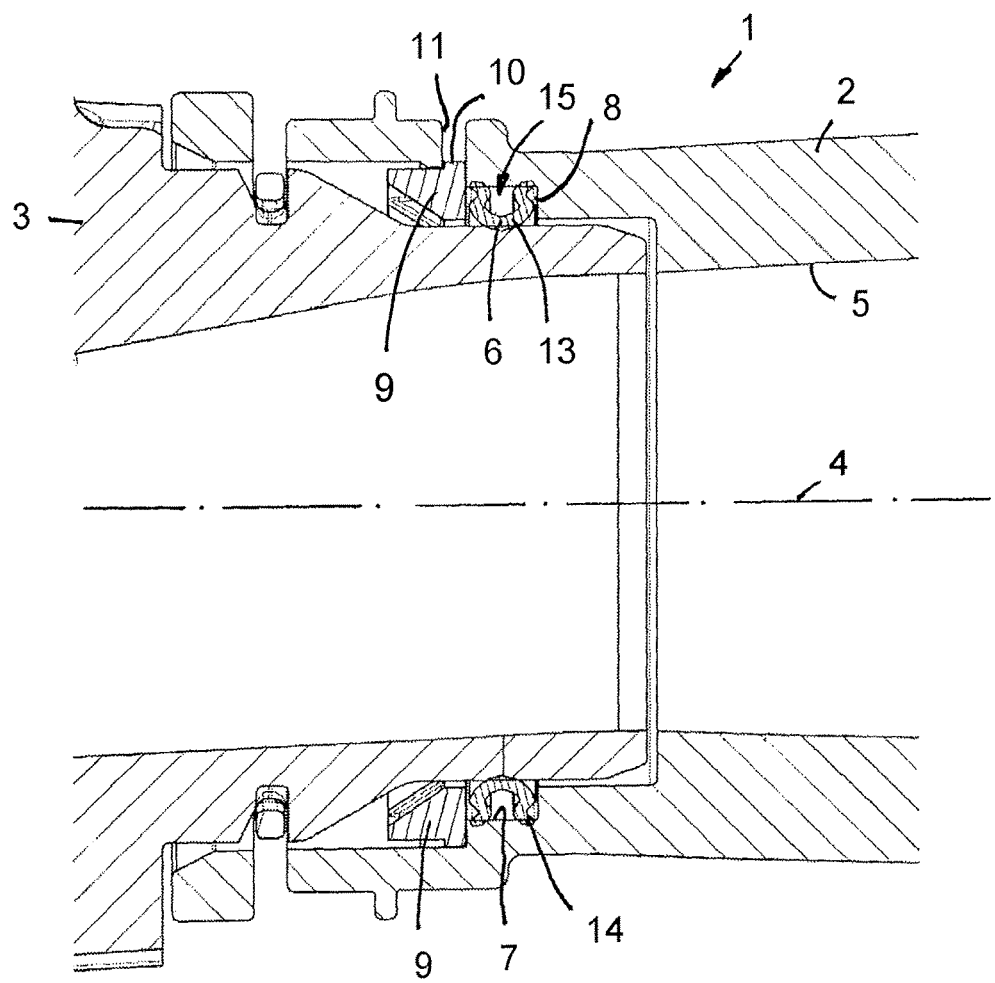
FIG. 1 is an axial longitudinal section view of a plug-in connection according to the invention.

FIG. 1 shows a plug-in connection 1 which can be used in an intake duct of an internal combustion engine for a gas-tight connection between a connecting part 2 and a plug-in part 3. Connecting part 2 and plug-in part 3 are arranged coaxially and have the same longitudinal axis 4. Inside the connecting part 2 and the plug-in part 3, a passage 5 is provided for transporting fluid, e.g. air.

Figure 2:
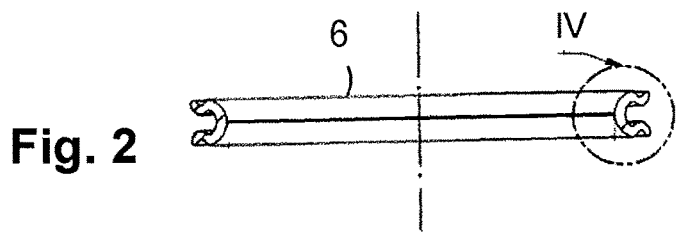
FIG. 2 is a view of a sealing ring with an omega-shaped cross section.
Figure 3:
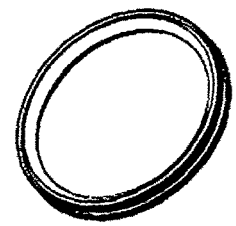
FIG. 3 is a perspective view of the sealing ring.
Figure 4:
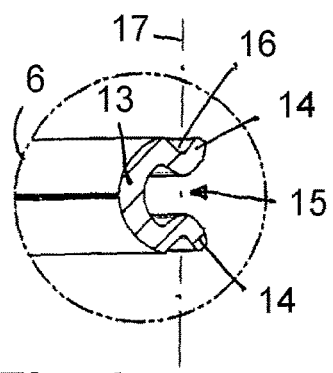
FIG. 4 is an enlarged view of detail IV of FIG. 2.

For enabling a gas-tight transport of the fluid, the plug-in connection 1 comprises a sealing ring 6 in a sealing groove 7 which is positioned close to the front face of the connecting part 2. The sealing ring 6 is shown in detail in FIGS. 2 to 4.

The sealing ring 6 surrounds the plug-in part 3 so that the radial inner face—with reference to the longitudinal axis 4—of the sealing ring 6 contacts the outer face of the plug-in part 3 and the outer face of the sealing ring 6 contacts the inner face of the connecting part 2 which is part of the sealing groove 7. The sealing ring 6 exerts a sealing pressure in the radial direction between the connecting part 2 and the plug-in part 3.

The sealing ring 6 is axially supported by an inner wall 8 of the sealing groove 7 which is part of the connecting part 2. Opposite to the inner wall 8, the sealing ring 6 is axially supported by a retention ring 9 which is a separate component that is independent both of the connecting part 2 and the plug-in part 3. The retention ring 9 is positioned on the outer face of the plug-in part 3 and is limiting the sealing groove 7 axially. Hence, the sealing ring 6 is axially supported by the inner wall 8 and by the retention ring 9.

A nose 10 is part of the retention ring 9 and projects radially from the outer side of the retention ring 9 so as to protrude into an opening 11 in the wall of the connecting part 2. Therefore, the retention ring 9 is held by form fit at the connecting part 2. In another embodiment, the nose 10 is made of one piece with the connecting part 2.

The sealing ring 6 has an omega-shaped cross section comprising a rounded body portion 13 and two supporting legs 14 which are arranged at the end of the body portion 13 next to the open side 15 of the rounded body portion 13. Rounded body portion 13 and supporting legs 14 are monolithic. The transition between the rounded body portion 13 and each supporting leg 14 is shaped as a recess 16. With reference to the lateral direction 17 which is parallel to the longitudinal axis 4 in the mounted position according to FIG. 1, each supporting leg 14 is positioned at an angle to the lateral direction 17 which is approximately in a range between 30° and 60°.

The width of the legs 14 is slightly smaller than the width of the rounded body portion 13. Therefore, the legs 14 can be bent easily when radial pressure is exerted on the sealing ring 6. The same effect can be produced when the transition forming the recess 16 has a smaller width than the rounded body portion 13 and the legs 14.

In the assembled configuration shown in FIG. 1, the rounded body portion 13 is contacting the outer face of the plug-in part 3. The open side 15 and the legs 14 are supported by the inner face of the sealing groove 7 at the radial opposite side. This arrangement is advantageous both for the assembly of the plug-in connection 1 and for the gas-tight connection of the connecting part 2 and the plug-in part 3. During assembly, plug-in part 3 is plugged into the connection part 2 which has a wider diameter than the plug-in part 3. The outer face of the plug-in part 3 contacts the rounded body portion 13 and exerts a frictional force on the sealing ring 6 in the axial direction. As the outside of the rounded body portion 13 has only a small contact point with the outer face of the plug-in part 3, the frictional force is small and the deformation of the sealing ring 6 is limited to a small amount. After the plug-in part 3 has reached its final axial position, the sealing ring 6 which is made of elastic material returns to its initial configuration shown in FIG. 1.

The gas-tight connection is accomplished in an improved way due to two contact points at each supporting leg 14 of the sealing ring 6 at the outer face and one contact point at the rounded body portion 13 at the inner face in the sealing groove 7. The radial deformation of the sealing ring 6 increases the sealing pressure in the radial direction. The inner wall 8 on one axial side and the retention ring 9 at the opposite axial side support the sealing 6 axially.

Figure 5:
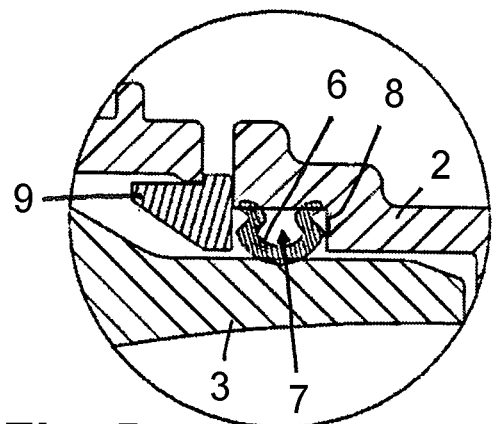
FIG. 5 is an enlarged view of the sealing ring arranged in the sealing groove that has a rectangular cross section.
Figure 6:
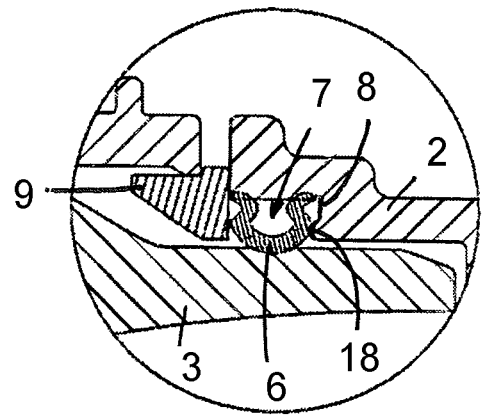
FIG. 6 is a view similar to FIG. 5, but shows a protrusion configured as a rounded nose at the connecting part protruding into the rectangular cross section of the sealing groove.
Figure 7:
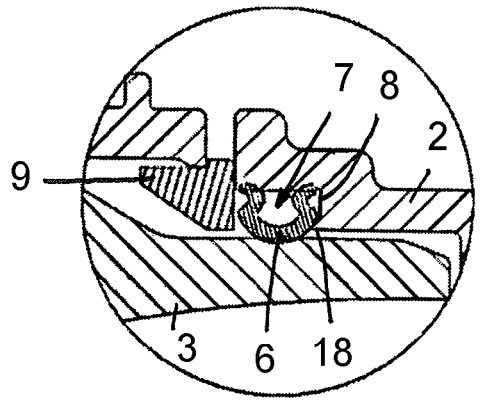
FIG. 7 is a view similar to FIG. 5 or FIG. 6, but shows a protrusion configured as a tip with an inclined surface at the connecting part protruding into the rectangular cross section of the sealing groove.

FIGS. 5, 6, and 7 show different configurations of the sealing groove 7. According to FIG. 5 which corresponds to the configuration of FIG. 1, the sealing groove 7 has a rectangular cross section and is delimited at the radial inner side by the plug-in part 3, at the radial outer side by the connection part 2, and in the axial direction by the inner wall 8 belonging to the connecting part 2 and by the retention ring 9. The inner wall 8 has a planar surface extending in the radial direction.

FIG. 6 shows basically the same view of the sealing groove 7 receiving the sealing ring 6 but differs in regard to the cross section of the sealing groove 7. Adjacent to the radial inner side, there is an axial protrusion 18 which is shaped like a rounded nose and is part of the connecting part 2. Protrusion 18 is monolithic with the connecting part 2. The protrusion 18 improves the axial support action for the sealing ring 6.

In another configuration according to FIG. 7, the protrusion 18 on the inner wall 8 of the connecting part 2 has a tip with an inclined surface adjacent to the radial inner side of the sealing groove 7. The tip is monolithic with the connecting part 2. The tip 18 has its longest extension on the radial inner side of the inner wall 8 while the inclined surface extends in an angular position from the tip 18 to the inner wall 8.

While specific embodiments of the invention have been shown and described in detail to illustrate the inventive principles, it will be understood that the invention may be embodied otherwise without departing from such principles.

What is claimed is:

1. A plug-in connection between a connecting part and a plug-in part which are configured to be plugged into one another in an axial direction of the plug-in connection, the plug-in connection comprising:
   a sealing groove disposed between the connecting part and the plug-in part;
   a sealing ring disposed between the connecting part and the plug-in part in the sealing groove, the sealing ring supported in the sealing groove by the connecting part and by the plug-in part, respectively, in a radial direction of the plug-in connection and exerting a sealing pressure in the radial direction;
   the sealing ring comprising an omega-shaped cross section comprising a rounded body portion with an open side and further comprising supporting legs connected to opposed ends of the rounded body portion at the open side of the rounded body portion;
   the open side of the rounded body portion facing outwardly in the radial direction;
   the plug-in connection further comprising:
      an opening formed in a circumferential wall of the of the connecting part;
      a retention ring axially positioned next to an open front face of the sealing groove and axially supporting the sealing ring in the sealing groove, the retention ring having
         a radially outwardly projecting nose formed on and projecting radially outwardly away from an outer circumference of the retention ring, the radially outwardly projecting nose protruding into and engaging into the opening formed in a circumferential wall of the of the connecting part, holding the retention ring axially in position on the connecting part.

2. The plug-in connection according to claim 1, wherein one of the supporting legs at the open side of the rounded body portion is supported by the retention ring.

3. The plug-in connection according to claim 1, wherein the supporting legs have a first width and the rounded body portion has a second width,
   wherein the first and second widths are identical.

4. The plug-in connection according to claim 1, wherein the supporting legs each have a front end extending in the axial direction approximately as far as the rounded body portion.

5. An intake duct of an internal combustion engine comprising a plug-in connection according to claim 1.

6. The intake duct according to claim 5, wherein the plug-in connection is positioned upstream of a compressor.

7. A plug-in connection between a connecting part and a plug-in part which are configured to be plugged into one another in an axial direction of the plug-in connection, the plug-in connection comprising:
   a sealing groove disposed between the connecting part and the plug-in part;
   a sealing ring disposed between the connecting part and the plug-in part in the sealing groove, the sealing ring supported in the sealing groove by the connecting part and by the plug-in part, respectively, in a radial direction of the plug-in connection and exerting a sealing pressure in the radial direction;
   the sealing ring comprising an omega-shaped cross section comprising a rounded body portion with an open side and further comprising supporting legs connected to opposed ends of the rounded body portion at the open side of the rounded body portion;
   the open side of the rounded body portion facing outwardly in the radial direction;
   the plug-in connection further comprising
      a protrusion projecting into the sealing groove and configured to axially support the sealing ring.

8. The plug-in connection according to claim 7, wherein the protrusion has a rounded nose.

9. The plug-in connection according to claim 7, wherein the protrusion has a tip with an inclined surface.

10. The plug-in connection according to claim 7, wherein the protrusion extends in the axial direction of the plug-in connection.

11. The plug-in connection according to claim 7, wherein the protrusion is a component of the connecting part.

12. The plug-in connection according to claim 7, wherein one of the supporting legs at the open side of the rounded body portion is supported by a retention ring.

13. An intake duct of an internal combustion engine comprising a plug-in connection according to claim 7.

* * * * *